Patented July 17, 1934

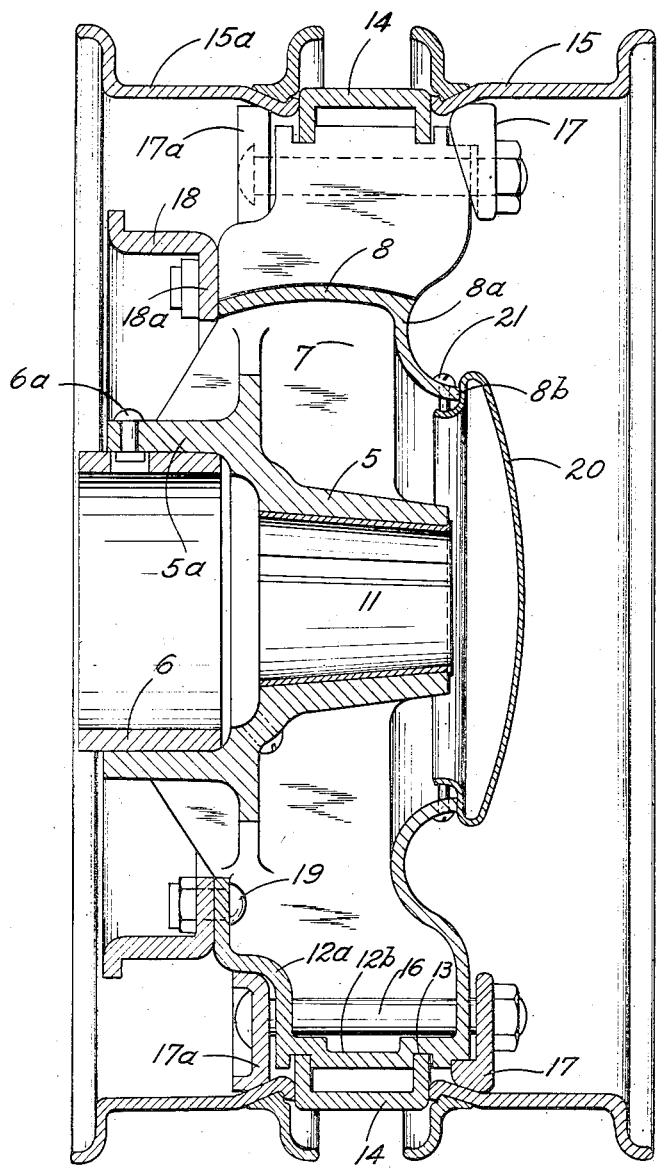

1,966,828

UNITED STATES PATENT OFFICE 1,966,828

MOTOR WHEEL

Philip M. Miller, Cleveland, Ohio

Application February 12, 1931, Serial No. 515,222

7 Claims. (Cl. 301—65)

This invention relates to wheels for motor vehicles, and particularly but not necessarily to dual-tire wheels of the heavy duty type.

The primary object of the invention is to provide an improved type of cast metal wheel which is light in weight yet embodies great strength and is designed to facilitate casting at the foundry.

Another object of the invention is to provide a cast metal wheel having walls so constructed that the parts serve to reinforce one another, and to provide a hollow construction which acts to ventilate the wheel and dissipate heat during service.

Another object of the invention is to provide a wheel of the cast metal type having a hub and nave portion of open or skeleton construction which is reinforced in a particularly advantageous manner adjacent the point where the hub is keyed to an axle shaft.

A further object of the invention is to provide a cast metal wheel which is strong and rugged, yet has symmetrical lines and beauty of design.

The foregoing and other objects will become apparent in view of the following description taken in conjunction with the drawings, wherein:

Fig. 2 is a transverse sectional view taken substantially on the line 2—2, Fig. 1.

Figure 1:
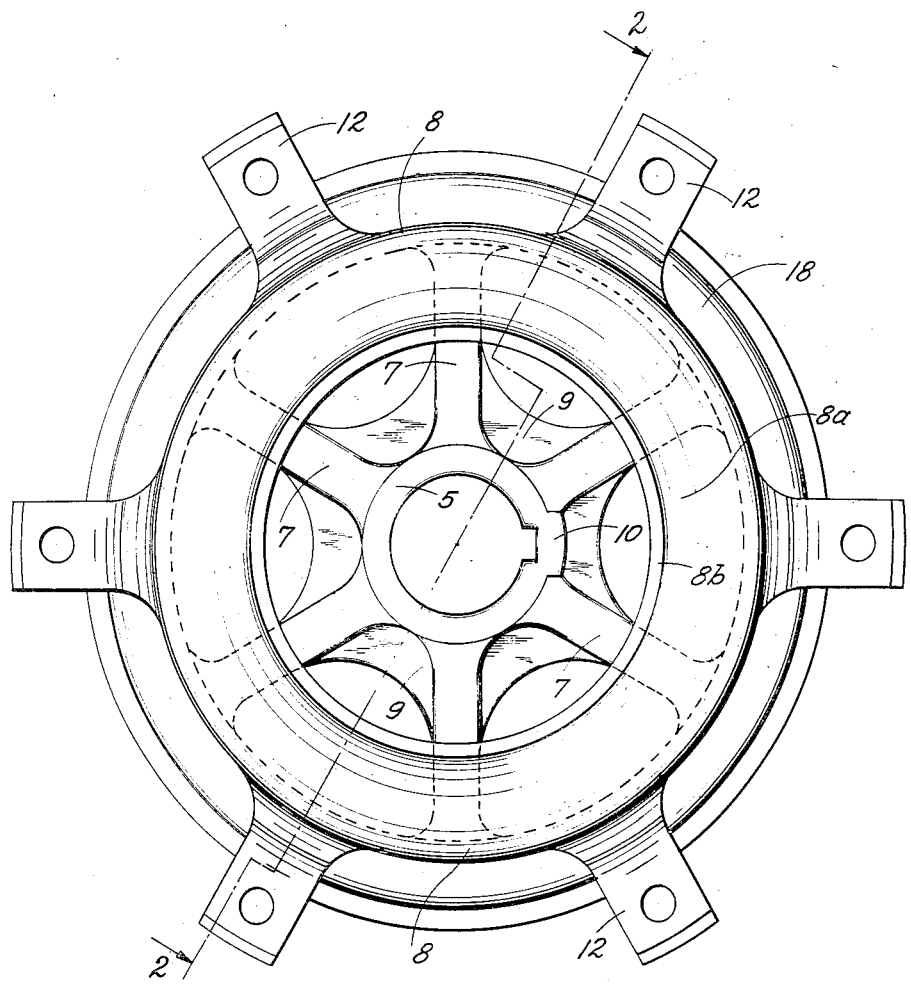
Figure 1 is a view in outboard side elevation of a wheel constructed in accordance with the features of the invention, the hub and nave covering shell being omitted to show the central nave structure.

Referring to the drawings in detail, the wheel comprises an integral casting formed with a hub barrel 5, which may be adapted for either a driven or non-driven axle shaft, but which in the drawings is shown as being adapted for a driven axle shaft. The inboard portion 5a of the hub barrel is preferably provided with a steel insert 6 which may, if desired, extend the full axial length of the said barrel. This insert is preferably secured to the portion 5a of said barrel by means of rivets 6a which may be substituted by any suitable fastening means.

The central nave portion of the wheel is of open spider like construction and is defined by a series of radial projecting ribs 7 which are joined at their outer ends to an annular body wall 8. The ribs 7 preferably extend radially such distance as will provide a relatively large open central nave area which occupies the greater portion of the wheel diameter, said ribs being rugged and extending axially for practically the entire length of the hub barrel so that they adequately reinforce the skeleton nave structure against side thrust during road service. To reinforce the said nave structure against torque thrust, the periphery of the hub barrel has formed thereon a series of fillets 9 which are joined to the ribs and form a webbed construction.

In cast metal wheels, it is essential that the hub of the wheel be so constructed that an effective and rugged driving connection may be set up between the axle shaft and said hub. This is particularly true in a wheel of the skeleton nave type. Accordingly, I cast the hub wall adjacent the keyway with an increased thickness of metal, as indicated at 10, Fig. 1, the thickened portion lying between the inner ends of two adjacent ribs and being braced by the latter to thereby doubly reinforce the hub adjacent said key-way. To insure against chipping of the metal by the hardened steel key usually used in keying a driven axle to a hub, the hub bore may be provided with a steel sleeve 11. Thus the relatively soft metal of the hub barrel is protected while at the same time the thickened portion 10 amply reinforces the barrel adjacent the point where it is splined to an axle shaft.

The body wall 8 is preferably transversely arched and at spaced points is projected radially to define relatively short hollow spokes 12. The spokes 12 are preferably in staggered relation with respect to the ribs 7, to thereby provide what is in effect a trussed cantilever construction, and at their bases the spokes are open toward the central or nave portion of the wheel. Thus the spider is hollow from the periphery of the hub barrel to the end wall of each spoke. This hollow or open type of wheel construction assists materially in dissipating heat generated while in service on the road. The body wall 8 converges radially inwardly on the outboard side of the wheel as at 8a and then is flared outwardly and terminates in a free outer edge or shell-engaging portion 8b.

The spokes 12 are preferably transversely offset as at 12a so that the load is imposed in a substantially straight line on the ribs 7 and transmitted therethrough to the hub barrel.

The periphery of each spoke is closed by a roof wall 12b, and said wall is provided with spaced circumferential recesses 13 adapted to receive an annular spacer ring 14. On each side of the spacer ring 14, tire rims 15 and 15a are mounted by means of locking bolts 16 and clamping members or locking lugs 17 and 17a. While the particular rim-mounting construction forms no part of the present invention, it will be noted that the spacer ring is held rigidly against transverse displacement, while at the same time the load is transmitted in a substantially straight line through the spokes 12 and ribs 7 to the hub barrel 5, 5a.

The design of the spider member is such that the body wall 8 and spoke walls may be made of substantially uniform thickness throughout, to facilitate casting at the foundry, the liability of casting strains during cooling of the casting being greatly reduced.

As a further means of reinforcing the spider member or wheel proper, I provide a brake drum 18 having a relatively short web 18a which is preferably secured to the inboard side wall of each spoke at the base thereof as indicated at 19. Due to the fact that the drum has a relatively short web, its manufacture is facilitated, and in addition, the attachment of the drum to the spider member at the particular point noted greatly strengthens said spider and renders the latter more rigid.

On the outboard side of the wheel, a nave-covering shell 20 is mounted, said shell being shown as telescoped into the outwardly flared portion 8b of the wall 8 and detachably secured in position by means of screws 21. Thus the central open nave portion of the wheel is closed and protected from the entrance of extraneous substances, while at the same time the wheel is rendered more attractive and symmetrical in design. Actual experience has shown metal to metal contact does not close the wheels sufficiently tight to prevent dissipation of heat that may be generated in the wheel and collected in the central open nave structure.

It will be understood that certain modifications in structure may be adopted within the scope of the invention as defined by the appended claims.

Having thus described my invention, what I desire to secure by Letters Patent is:

1. A wheel for motor vehicles, comprising a free spoked spider member adapted to be cast as an integral unit and formed with a hub, integral rib members projecting radially from said hub in spider formation and merging into an annular wall which is projected radially at spaced points to form the spoked periphery of the wheel, tire rim clamping and locking means on said periphery, said hub being provided with an axle bore adapted to be removably engaged with an axle shaft, and a thickened portion of material integrally conglomerated with said hub at a point between the union of the ends of two of said integral rib members in a manner such that said thickened portion is radially extended and merged with said integral members to provide a union between said members and hub, a key-way being provided in said thickened portion which is continuous with said bore in the hub and adapted to removably hold a key member adapted for engagement in a corresponding key-way provided in a vehicle shaft to hold said shaft in driving engagement with the hub.

2. In a cast metal wheel for motor vehicles, a spider-like nave portion defined by a hub barrel formed with an axle bore the wall of which is formed with a key-way to provide a keyed driving connection with an axle shaft and a series of ribs projecting radially from said barrel, said wall being cast with an increased thickness of metal around the key-way and between two adjacent ribs to reinforce the hub at that point.

3. In a cast metal wheel for motor vehicles, a hub formed with an axle bore, a hard metal bushing secured in said bore, the wall of the hub and said bushing being formed with a keyway to provide a driving connection with an axle shaft, ribs formed integrally with said hub and projecting radially therefrom in spider formation, an annular wall cast integral with said ribs and formed with relatively short radial projections defining the spokes of the wheel, the wall of the hub around the key-way being increased in thickness with the thickened portion lying between the inner ends of said ribs and braced by the latter to thereby doubly reinforce the hub adjacent said key-way.

4. In a wheel for motor vehicles, a free-spoked integrally cast metal spider member formed with a hub having an axle bore therethrough and a drive shaft key-way formed in the wall thereof, ribs projecting from said hub in spider formation, leaving a relatively large open central area around the hub, said ribs merging into an annular wall which is projected radially at spaced points defining the spokes of the wheel, the wall of the hub around the key-way being formed with a reinforcing thickened portion which lies between the inner ends of two adjacent ribs and is in turn reinforced by the latter.

5. In a wheel for motor vehicles, a cast metal free-spoke-end spider member adapted to be cast as an integral unit, said spider member being formed with a transversely-extended hub barrel, spaced ribs formed integrally with said barrel and projecting radially therefrom in spider formation for a distance such as will leave an open area around the hub for the greater portion of the wheel diameter, a transversely-arched annular body wall of substantially uniform thickness throughout cast around the ends of the ribs and converging radially inwardly on the outboard side of the spider and then flaring outwardly with its free outer edge forming means for attaching a nave-covering shell thereto, the periphery of the said wall being projected radially at spaced points in alternate truss arrangement relatively to the ribs to provide free spoke ends also having walls of substantially the same thickness as said body wall, said ribs at their juncture with the hub barrel being extended transversely for substantially the entire length of the barrel and tapering toward the body wall to brace the wheel against side thrust, the metal between the hub barrel and ribs being cast in webbed form to brace the wheel against torque thrust.

6. In a dual tire wheel for motor vehicles, a main spoked spider member adapted to be cast as an integral unit and formed with a hub having ribs projecting radially therefrom in spider formation for the greater area of the wheel diameter to provide a relatively large open nave portion which lightens and ventilates the wheel, a wall surrounding and joining the outer ends of said ribs into an integral structure, said wall being projected radially at spaced points to form the side walls of hollow spokes which open at their bases into said open nave portion, and a top wall formed integral with said side walls and closing off the ends of the spokes, the inner and outer side walls of said spokes being curved outwardly with the outer wall defining an annular shell-engaging flange and the inner wall providing an attaching flange for a brake drum member.

7. In a dual tire wheel for motor vehicles, a main spoked spider member adapted to be cast as an integral unit and formed with a hub having ribs projecting radially therefrom in spider formation for the greater area of the wheel diameter to provide a relatively large open nave portion which lightens and ventilates the wheel, a wall surrounding and joining the outer ends of said ribs into an integral structure, said wall being of substantially uniform thickness throughout and projected radially at spaced points to form the side walls of hollow spokes which open at their bases into said open nave portion, a top wall formed integral with said side walls and closing off the ends of the spokes and strengthening the latter, the wall at the ends of the ribs being extended radially inwardly with the inner edge thereof flaring toward the outer side of the wheel around the end of the hub, and a shell secured to said flared edge and enclosing the central rib portion of the wheel.

PHILIP M. MILLER.